Dec. 13, 1966        J. D. LIERMAN        3,291,515

CAN LID RETAINER

Filed Oct. 24, 1965

*INVENTOR.*
JOHN D. LIERMAN

United States Patent Office 3,291,515
Patented Dec. 13, 1966

3,291,515
CAN LID RETAINER
John D. Lierman, 9203 Woolworth St., Omaha, Nebr.
Filed Oct. 24, 1965, Ser. No. 504,652
3 Claims. (Cl. 292—288)

This invention relates to a receptacle cover securing device, and more particularly to such a device adapted for use with trash or garbage cans.

A primary object of the invention is to provide a receptacle cover securing means whereby the cover may be held in operative or inoperative position, so that the cover may not be lost, and further, so that the cover may not be displaced when in operative position and most importantly, it is an object to provide such a securing means of a construction such that it can be readily applied to the receptacle and cover without the use of tools, the new securing means being economical in its construction utilizing a pair of springs interconnected by a wire having a loop in it for economical and easy attachment to a receptacle cover handle.

Still another object is to provide a cover holding means as described which can be merchandised at a time when it is not connected to a receptacle cover and yet as a single connected unit, to avoid a disadvantage in this regard of cover securing devices of the prior art, the holding means being easily attached to the receptacle cover handle without the use of tools, whereby attachment can easily be done by a consumer.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
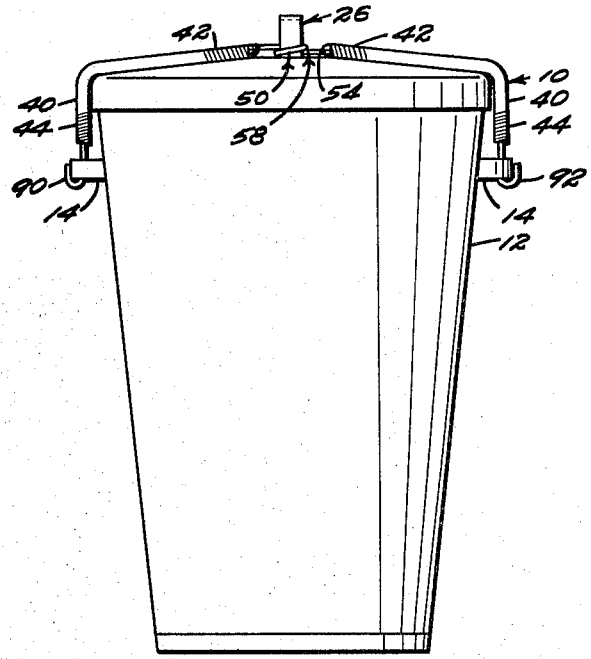
FIGURE 1 is a side elevation of a cover securing device of this invention shown in position on a receptacle having a cover, a central loop of the device being shown in a preferred position of final installation.

Referring now to the drawing, the cover holding means of this invention is there generally indicated at 10 in FIGURE 1 as attached to a receptacle 12 having a pair of side handles 14, the receptacle having a cover 20 provided with a handle 26 of a conventional shape.

The handle 26 has side portions, one of which is shown at 28 and an upper portion indicated at 30, the side portions 28 being secured to the upper side of the cover 20 and the entire handle 26 being substantially of an inverted U-shape.

The cover holding means of this invention is generally indicated at 10 and has a pair of springs 40 which are elongated and provided with upper ends 42 and lower ends 44. A securing means 50 of this invention is provided for attaching the springs 40 to the handle 26 and comprises a wire 54 having a loop 58 between its ends and extending around the handle 26 preferably on one of the side portions 28 thereof. The loop 58 extends across an outer side of the handle 26 by means of a portion 60 thereof and has two portions 62 and 64 extending across the inner side of the handle 26.

Suitable means 70 are provided for attaching outer ends 80 and 82 of the wire 50 to the upper ends 42 of the springs 40 respectively.

First and second means 90 and 92 attach lower ends of the springs 44 to the receptacle handles 14 respectively.

One of the springs 40, its receptacle handle 14, its handle attaching means 92, and the said wire 50, together with said wire-to-spring connecting means 70 all forming an assembly of parts, two of said parts are readily disconnectable to facilitate removal of the cover 20 from the receptacle 12.

The two parts which are most preferably disconnectable are one of the first and second attaching means 90 or 92, and for that reason, at least one of the means 90 or 92 is in the form of a hook and is open for that purpose.

The other attaching means can be permanently attached to the respective handle 14, although it is also originally in the form of a hook before being bent into a permanent attaching position, as shown at 90 in FIGURE 1.

Figure 2:
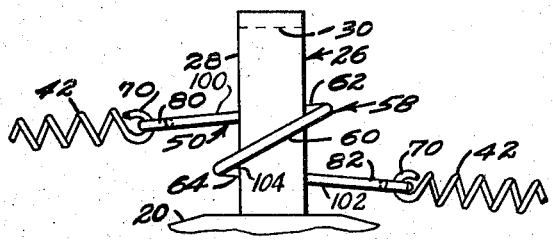
FIGURE 2 is a detail showing a central portion of the holding means of this invention with its loop shown in an intermediate position of installation.

To install the cover holding means a wire outer end 82 is placed extending through the handle 26, then the opposite spring 42 is passed through the handle 26 until the opposite wire outer end 80 is also extending through the handle so that parts are in the positions shown in FIGURE 2.

It will be seen that the loop 58 has lapping portions 100 and 102 which are disposed on the same side of the loop and one above another when the walls of the opening 104 of the loop are held in vertical position, the lapping portions 100 and 102 being those portions immediately inward of the outer ends 80 and 82, and being sufficiently free of any interconnection, except by means of the remainder of the loop, that the handle 26 of the cover can pass between the lapping portions 100 and 102 into the loop for facilitating attachment of the loop to the handle in the manner described.

For the effective permanent installation on the handle, it is not necessary to compress the loop 58 from the open position of FIGURE 2 to the closed position of FIGURE 1, although some will prefer to so compress it.

As thus described, this invention is believed to fufill the objectives above set forth in providing an economical, simple, and efficient cover holding device.

From the foregoing description, it is thought to be obvious that a can lid retainer constructed in accordance with my invention is particularly well adapted for use, by reason of the covenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A cover holding means for a receptacle having a pair of side handles and a cover provided with a handle in the center of the top thereof, said cover holding means comprising a pair of springs, said springs being elongated and having upper ends and lower ends, securing means for said springs comprising a wire having a loop between its ends for extending around said handle by extending across an outer side of said handle and across an inner side of said handle, and means for attaching the outer ends of said wire to upper ends of said springs respectively, and first and second means attaching lower ends of said springs to said receptacle handles respectively, said loop having lapping portions disposed on a same side thereof and disposed one above another when the walls of the opening of said loop are held in vertical position, the said lapping portions being sufficiently free of any interconnection except by means of the remainder of said loop that the handle of said cover can pass between said lapping portions into said loop for facilitating attachment of said loop to said handle.

2. The combination of claim 1 in further combination with a receptable and cover as described and further in which one of said springs, it receptacle handle, its handle attaching means, said means for attaching said one spring to said wire and said wire form an assembly of parts, two of said parts being readily disconnectable to facilitate removal of said cover from said receptacle.

3. The combination of claim 1 in which one of said first and second attaching means is an open hook to facilitate removal from its receptacle handle.

References Cited by the Examiner
UNITED STATES PATENTS 2,687,318   8/1954   Cooper _____ 220—55.7
2,998,276   8/1961   Shettler _____ 220—55.7

THERON E. CONDON, *Primary Examiner.*

G. T. HALL, *Assistant Examiner.*